United States Patent
Brisco

(10) Patent No.: US 11,493,827 B2
(45) Date of Patent: Nov. 8, 2022

(54) MULTIFUNCTIONAL ELECTRONIC DEVICE CASE

(71) Applicant: Elise Brisco, Santa Monica, CA (US)

(72) Inventor: Elise Brisco, Santa Monica, CA (US)

( * ) Notice: Subject to any disclaimer, the term of this patent is extended or adjusted under 35 U.S.C. 154(b) by 278 days.

(21) Appl. No.: 16/908,562

(22) Filed: Jun. 22, 2020

(65) Prior Publication Data

US 2020/0319531 A1 Oct. 8, 2020

Related U.S. Application Data

(63) Continuation-in-part of application No. 16/175,154, filed on Oct. 30, 2018, now abandoned, which is a continuation-in-part of application No. 15/474,923, filed on Mar. 30, 2017, now Pat. No. 10,116,345, which is a continuation-in-part of application No. 15/211,977, filed on Jul. 15, 2016, now abandoned.

(60) Provisional application No. 62/193,362, filed on Jul. 16, 2015.

(51) Int. Cl.
| | |
|---|---|
| *G03B 11/04* | (2021.01) |
| *H04N 5/225* | (2006.01) |
| *G02B 25/00* | (2006.01) |
| *H04M 1/02* | (2006.01) |

(52) U.S. Cl.
CPC ......... *G03B 11/043* (2013.01); *H04N 5/2252* (2013.01); *G02B 25/002* (2013.01); *H04M 1/0264* (2013.01)

(58) Field of Classification Search
None
See application file for complete search history.

(56) References Cited

U.S. PATENT DOCUMENTS

| | | | | |
|---|---|---|---|---|
| 3,140,883 | A * | 7/1964 | Anthony | B42D 9/004 359/742 |
| 2003/0234988 | A1* | 12/2003 | Wang | G02B 25/005 359/809 |
| 2004/0204204 | A1 | 10/2004 | Brilliant et al. | |
| 2005/0101348 | A1 | 5/2005 | Wang | |
| 2007/0105603 | A1 | 5/2007 | Lishan | |
| 2008/0075455 | A1* | 3/2008 | Lin | G03B 17/56 396/534 |
| 2008/0094735 | A1* | 4/2008 | Chelberg | G02B 25/002 359/802 |
| 2009/0126158 | A1 | 5/2009 | Jian | |
| 2009/0237813 | A1* | 9/2009 | Erlich | H04M 1/027 359/809 |
| 2010/0239242 | A1 | 9/2010 | Ka et al. | |
| 2012/0176689 | A1 | 12/2012 | Brown | |
| 2013/0271857 | A1* | 10/2013 | Jaffee | H04M 1/027 359/811 |
| 2014/0333831 | A1 | 11/2014 | Oh et al. | |
| 2015/0277096 | A1 | 10/2015 | Kuo et al. | |

(Continued)

*Primary Examiner* — Rodney E Fuller
(74) *Attorney, Agent, or Firm* — Schmeiser, Olsen & Watts LLP

(57) ABSTRACT

A multifunctional case for cell phones, tablets, and other personal electronic devices with flip, sliding, and adjustable magnifying lens for viewing a screen is disclosed. The multifunctional case includes options with a detachable lens and a handle, allowing a user carrying a smartphone or similar personal electronic device mounted in the multifunctional case an immediately available means to magnify print on objects, giving the user various ways to eliminate many occasions where reading glassed are needed.

10 Claims, 19 Drawing Sheets

(56) References Cited

U.S. PATENT DOCUMENTS

| | | | |
|---|---|---|---|
| 2015/0293344 A1* | 10/2015 | Schainholz | G06F 1/1609 |
| | | | 359/822 |
| 2015/0338635 A1 | 11/2015 | Gantz | |
| 2016/0045003 A1 | 2/2016 | Chen | |
| 2016/0116348 A1 | 4/2016 | Lee et al. | |
| 2016/0213926 A1 | 7/2016 | Fukuma et al. | |
| 2016/0309010 A1 | 10/2016 | Carnevali | |
| 2016/0352384 A1 | 12/2016 | Ageishi | |
| 2017/0013097 A1 | 1/2017 | Edmonds | |
| 2017/0293150 A1* | 10/2017 | Montoya | G02B 25/002 |
| 2019/0346672 A1* | 11/2019 | Dosanjh | H04M 1/027 |

* cited by examiner

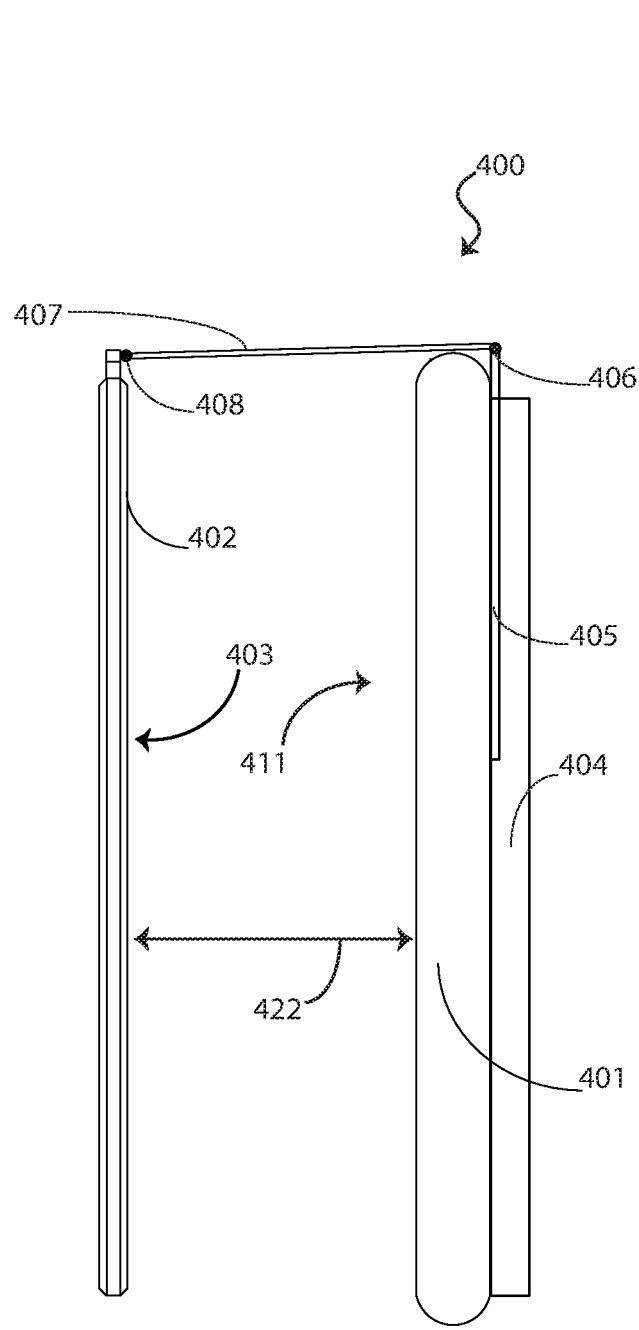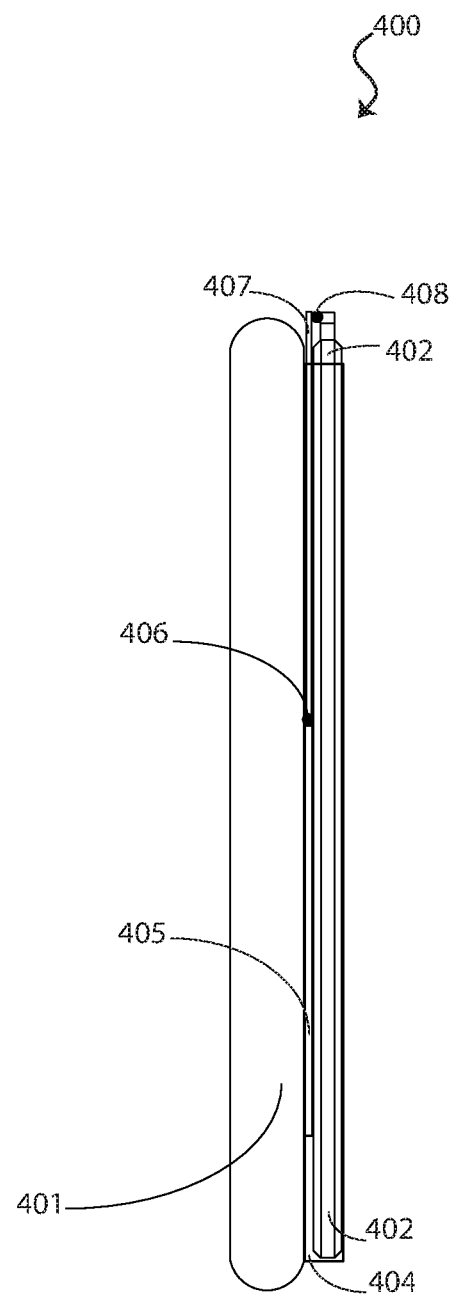
FIG. 14b
FIG. 14c

MULTIFUNCTIONAL ELECTRONIC DEVICE CASE

CROSS REFERENCE TO RELATED APPLICATION

This application is a continuation-in-part of U.S. patent application Ser. No. 16/175,154, filed Oct. 30, 2018, which is a continuation-in-part of U.S. patent application Ser. No. 15/474,923, filed Mar. 30, 2017, which is a continuation-in-part of U.S. patent application Ser. No. 15/211,977, filed Jul. 15, 2016, which claims priority from U.S. Provisional Patent Application No. 62/193,362 filed July 16, each of which are incorporated entirely herein by reference.

BACKGROUND OF THE INVENTION

Technical Field

This invention relates to cases for cell phones and other personal electronic devices. In particular, the invention relates to a multifunctional smartphone, tablet, or similar personal electronic device case with a multi-position lens for viewing the display screen or other item. The adjustable, multi-position lens enables users to magnify their phone or other display screen, or items such as labels, printed materials or other unreadable of undiscernibly small subjects, without the use of glasses or other aids.

State of the Art

A large percentage of the population with normal vision at-a-distance cannot see close-up without corrective lenses, such as "reading glasses." In addition to hyperopia, commonly known as farsightedness, an inability to focus on nearby objects is often caused by the gradual loss of elasticity of the lens of the eye—presbyopia—which is a normal consequence of aging. Although necessary, many find the use of glasses for reading or close vision only to be inconvenient and unfashionable. Because presbyopia is associated with aging, some persons believe the use of reading glasses makes them appear "old." Clearly visualizing a display screen on smartphones, cellular telephones, smart watches and other personal electronic devices is often difficult for persons with visual impairment, including presbyopia, and can be very difficult or impossible without reading glasses. Alternatively the viewer may need to move the subject very close to their eyes which is inconvenient and can be embarrassing.

There are problems with the use of reading glasses and other available devices attempting to address this issue. Reading glasses are frequently lost or damaged, thus often require replacement. Moreover, available devices to enhance viewing of smartphone screens and existing software applications to magnify the display are difficult to use, do not have a multifunctional purpose, and do not store well, among other shortcomings.

What is needed, therefore, is an adjustable, multi-function visual aid for reading smartphone and personal electronic device screens, with additional functionality to aid the viewing of print and other objects.

SUMMARY OF EMBODIMENTS

Disclosed is a multifunctional electronic device case comprising a body for receiving an electronic device and having a recess for receiving a cover; a sliding member coupled to the body proximate to the recess and having a first hinge; an articulating member coupled to the first hinge and having a second hinge, wherein the first hinge and the second hinge are located at opposite ends of the articulating member; and a cover coupled to the second hinge, wherein the cover is adjustably positioned with respect to the body.

In some embodiments, the multifunctional electronic device case further comprises a lens coupled to the cover. In some embodiments, the lens is detachably coupled to the cover.

In some embodiments, the body comprises a short side, wherein sliding member is coupled to the short side. In some embodiments, the sliding member moves with respect to the body in a direction parallel to the short side.

In some embodiments, the body comprises a long side, wherein sliding member is coupled to the long side. In some embodiments, the sliding member moves with respect to the body in a direction parallel to the long side.

In some embodiments, the multifunctional electronic device case further comprises a stand coupled to the body. In some embodiments, a plurality of stands are coupled to the body. In some embodiments, the sliding member is detachably coupled to the body.

Disclosed is a method of using a multifunctional personal electronic device case to magnify a screen image displayed by a personal electronic device comprising steps inserting a personal electronic device into a body of a multifunctional personal electronic device case having a cover coupled to a lens and a recess receiving the cover; sliding a sliding member coupled to the cover, causing the cover to be removed from the recess; and rotating an articulating member coupled to the sliding member, causing the cover to be positioned over a screen of the personal electronic device; wherein the lens magnifies the screen image of the personal electronic device.

Disclosed is a method of storing a lens of a multifunctional personal electronic device case used for magnifying an image displayed on the device screen comprising steps rotating the lens from a position over a screen of the personal electronic device to a position proximate to a recess of the multifunctional personal electronic device case; and moving a sliding member of the multifunctional personal electronic device case to position the cover within the recess.

An embodiment includes a multifunctional device case comprising: a body having an opening for receiving a mobile device, wherein the body is configured to retain the mobile device within the body; and a magnifying device coupled to the body of the device case, wherein the magnifying device comprises: a sliding member coupled to the body on a side opposite the opening of the body; an articulating member rotatably coupled to the sliding member with a first hinge; and a lens rotatably coupled to the articulating member with a second hinge, wherein the magnifying device is moveable between a stored position and a magnifying position, wherein: the stored position comprises the sliding member and the articulating member within a same plane and the lens adjacent to and within the same plane as the sliding member and the articulating member or adjacent to and parallel to the sliding member and the articulating member; and the magnifying position comprises the articulating member perpendicular to the sliding member, the lens perpendicular to the articulating member and the lens parallel to the sliding member with the lens spaced from and positioned over a screen of the mobile device retained within the body.

Another embodiment includes A method of using a multifunctional device case, the method comprising: coupling a mobile device within a body of the multifunctional device case, the device case comprising a magnifying device; moving the magnifying device from a stored position to a magnifying position to place a lens of the magnifying device in a position over and spaced from a screen of the mobile device; magnifying content displayed on the screen of the mobile device with the lens; and moving the magnifying device from the magnifying position to the stored position.

The foregoing and other features and advantages of the present invention will be apparent to those of ordinary skill in the art from the following more particular description of the invention and its embodiments, and as illustrated in the accompanying drawing figures.

BRIEF DESCRIPTION OF THE DRAWINGS

FIG. 14b is a cross-sectional view through line "L" of a multifunctional electronic device case holding an electronic device having an articulating member and a cover positioned over a device screen;

FIG. 14c is a cross-sectional view through line "L" of a multifunctional electronic device case holding an electronic device having an articulating member and a cover positioned in a recess;

DETAILED DESCRIPTION OF EMBODIMENTS OF THE INVENTION

Embodiments of the disclosed invention enable users to see their phone or other personal electronic device screen without the use of an alternative magnification means, such as reading glasses. Additionally, embodiments provide a magnifying lens as an extension of the user's cell phone—a device carried by nearly everyone. The device includes a magnifying lens which may be pivoted away or detached from the device screen for use in other commonly necessary applications, such as reading the small print on labels, menus, other small text, and the like. The disclosed device and methods of use provide a means for reading fine print that is always available to anyone carrying a smartphone.

Throughout this disclosure, the terms "phone case," "electronic device case," "personal electronic device case" are used interchangeable. Accordingly, "cell phone," "smartphone," "electronic device," and "personal electronic device" are also used interchangeably and, in the context of this disclosure and the claims that follow, mean any of a number of devices bearing a screen, such as a touchscreen, on which a user of the device views an image. In some, but not all, embodiments, the screen may additional provide a means wherein the user inputs instructions to the device, such as touching the screen by touching, tapping, swiping and the like.

Figure 1:
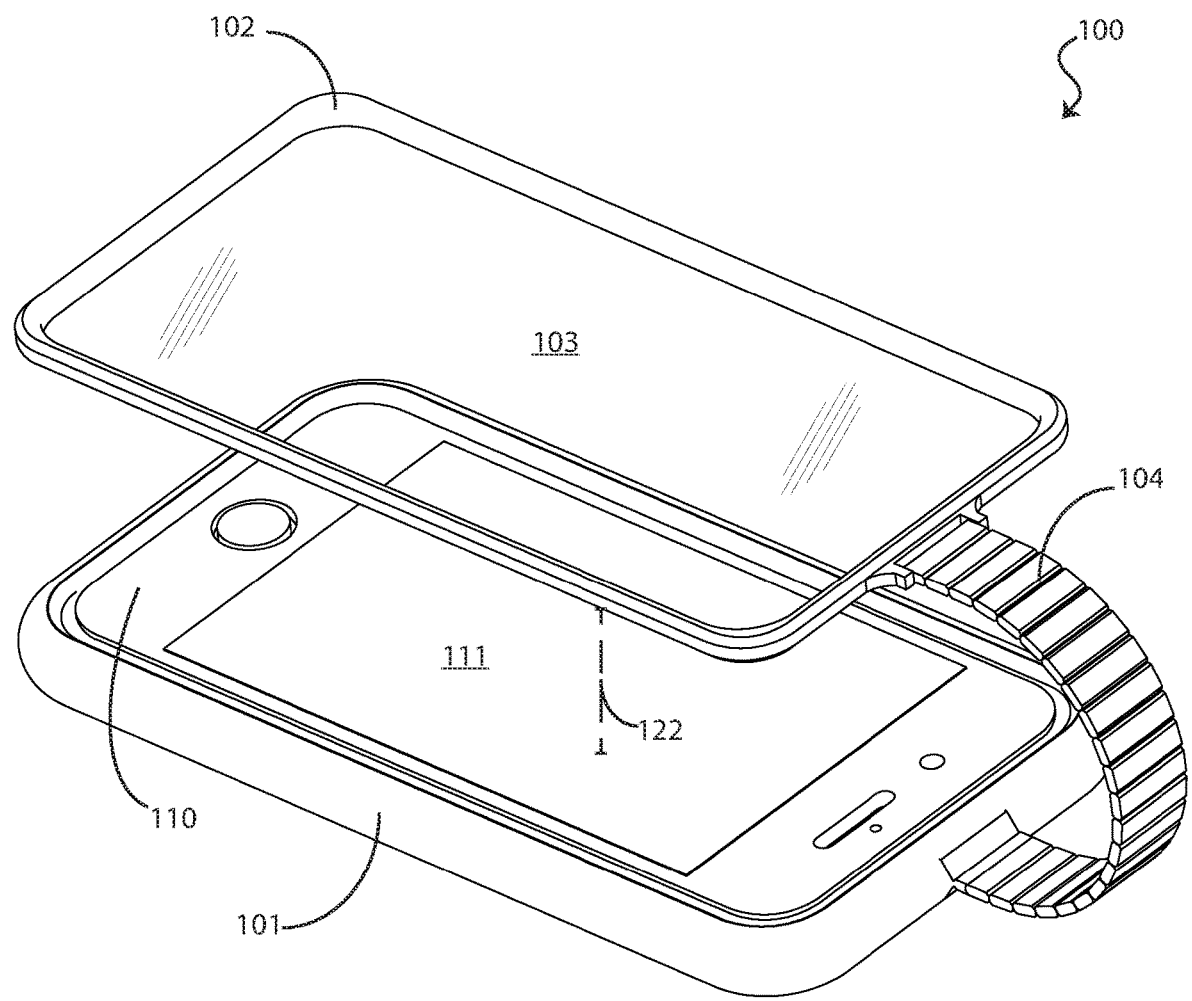
FIG. 1 is a front right perspective view a multifunctional electronic device case holding an electronic device.

FIG. 1 is a front right perspective view of a multifunctional phone case holding an electronic device. FIG. 1 shows a multifunctional phone case 100 holding an electronic device 110 having a device screen 111. Case 100 comprises a body 101. Body 101 has a shape substantially closed on four sides and a back/bottom, while open at the front/top to receive an electronic device 110, such as a smartphone. Similar to a conventional cover for a smartphone or other personal electronic device, the general shape of electronic device 110 may reversibly interlock with an internal feature of body 101, wherein electronic device 110 is freely removable from body 101. In this example, and in some other embodiments, electronic device 110 is a smartphone. This is not meant to be limiting. Electronic device 110 can be a tablet device, a conventional cell phone, a smart watch, a wearable electronic device, and the like, as shown in some embodiments. Consequently, body 101, is formed in different dimensions and shapes according to the particular electronic device 110 intended to be used with case 100.

Cover 102 is hingedly coupled to body 101 and has a lens 103. Cover 102, as shown in FIG. 1, encircles lens 103, acting as a mount for lens 103 and a structure wherein lens 103 is coupled to body 101 through an interposed adjustable means, such as an adjustably hinged coupling means, for example. Cover 102 may take many forms according to alternative embodiments. For example, in some embodiments, cover 102 is coupled to a segment of a perimeter of lens 103 without completely encircling the perimeter of lens 103, as in the embodiment shown in FIG. 1.

Also shown is a hinge member 104 coupled to body 101 and cover 102. In some embodiments, including the embodiment shown by FIG. 1, hinge member 104 comprises greater than three hinges linked together as a multiple hinge. In some alternative embodiments, hinge member comprises two hinges, or greater than three hinges linked together as a multiple hinge. In some embodiments, hinge member 104 comprises a single hinge. In some embodiments, hinge member 104 is a "living hinge," wherein hinge 104 is a thin flexible hinge made from the same material as the two rigid pieces it connects; namely cover 102 and body 101. In embodiments wherein hinge 104 comprises a plurality of hinges linked together, cover 102 bearing lens 103 is adjusted across a continuous range of positions, wherein lens 103 is positioned an adjustable distance 122 from device screen 111. Friction between hinge elements of each of the plurality of hinges comprising hinge 104 acts to stabilize a conformation of hinge 104, tending to hold cover 102 in a position set by the user of case 100. In some embodiments wherein lens 103 is a magnifying lens, adjustability of distance 122 allows a user of case 100 to select a desired magnification for an image viewed on device screen 111. Moving lens 103 closer to device screen 111 may decrease magnification of the image, while moving lens 103 further away from device screen 111 may increase magnification of an image, at least within a limited range of distances 122 for some embodiments wherein lens 103 has a fixed focal length.

Figures 2, 3:
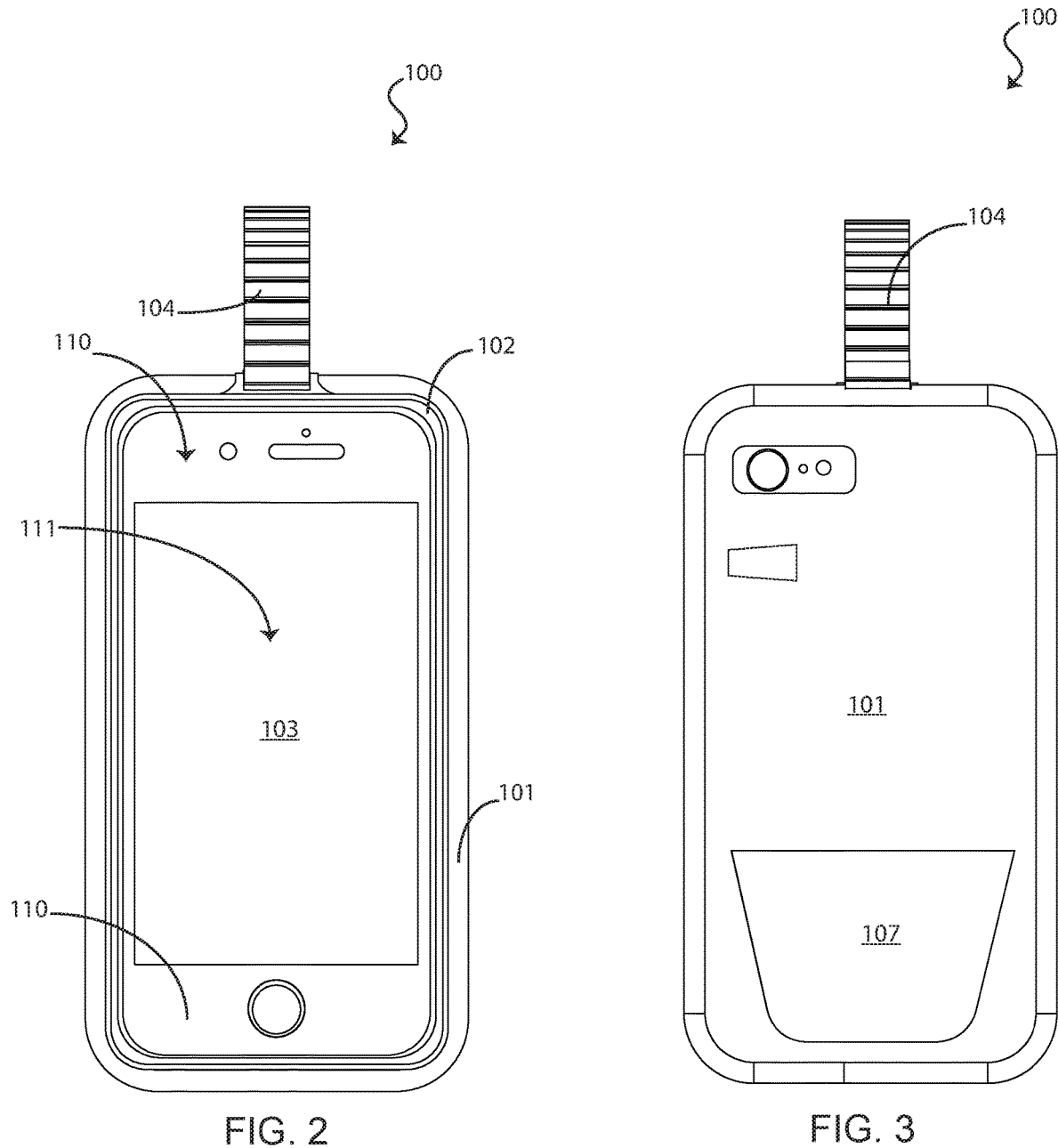
FIG. 2 is a front view of a multifunctional electronic device case holding an electronic device.
FIG. 3 is a back view of a multifunctional electronic device case holding an electronic device.

FIG. 2 is a front view of a multifunctional phone case holding an electronic device. FIG. 2 shows the front of electronic device 110 held by body 101. Device screen 111 can be seen beneath lens 103. Lens 103 is formed of a substantially transparent material, such as polycarbonate plastic, glass, and the like. Polycarbonate, other transparent plastic polymers, and "gorilla glass®"-like substances are preferred over glass for forming lens 103 due to the lighter weight and relative resistance to breakage of many synthetic plastics. This is not meant to be limiting, however; lens 103 may be formed from any suitably transparent material. Lens 102 is mounted onto cover 102, which is coupled to body 101 by hinge member 104. Accordingly, a user of case 100 may manipulate cover 102 to position lens 103 relative to device screen 111 to obtain a desired level of magnification of objects on screen 111. When electronic device 110 is not in use, the user may position cover 102 directly against the front surface of electronic device 110 for storage (see FIG. 5).

Figures 7, 8:
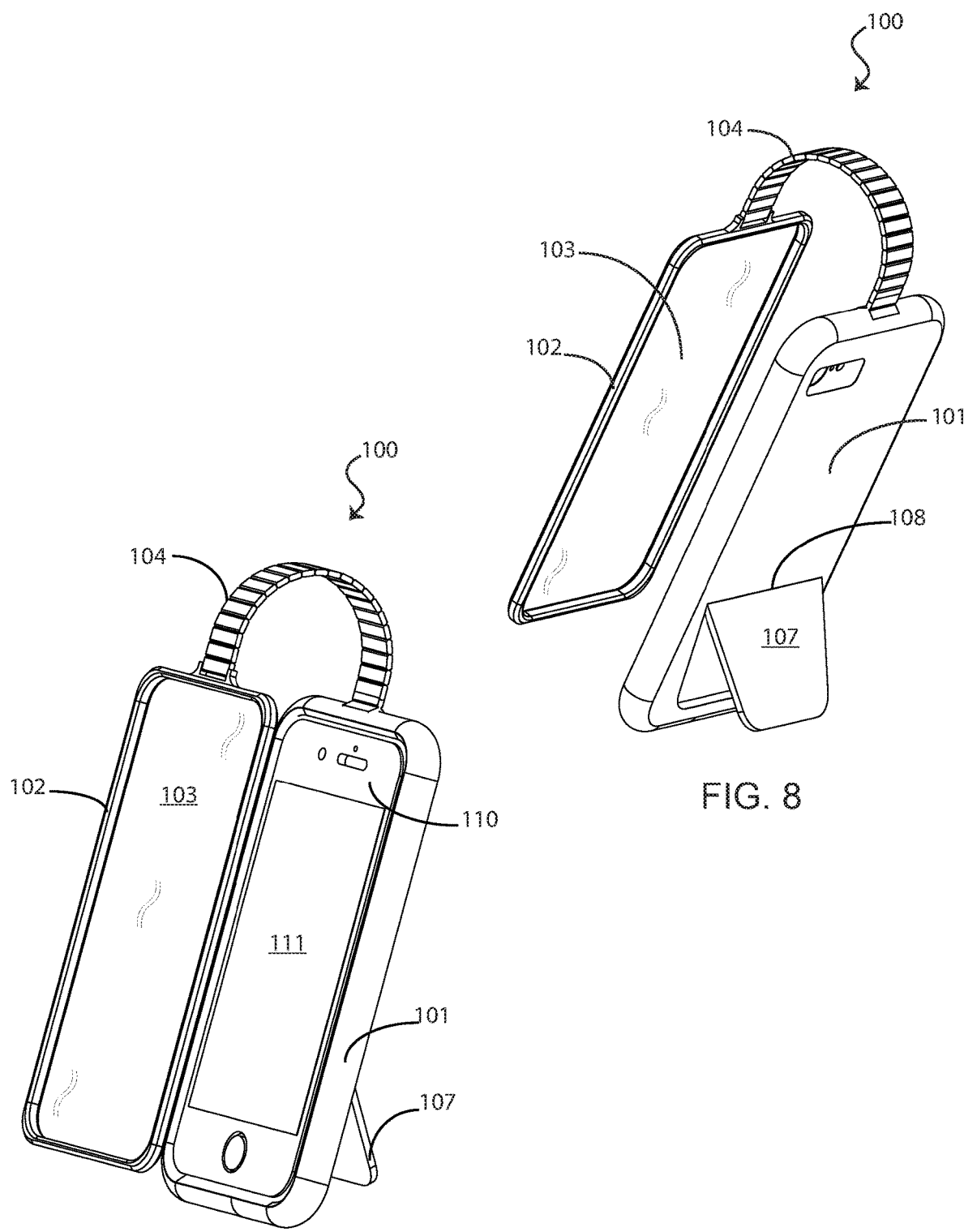
FIG. 7 is a front perspective view of a multifunctional phone case holding an electronic device and supported vertically by a deployed stand.
FIG. 8 is a rear perspective view of a multifunctional electronic device case holding an electronic device and supported vertically by a deployed stand.
Figure 9:
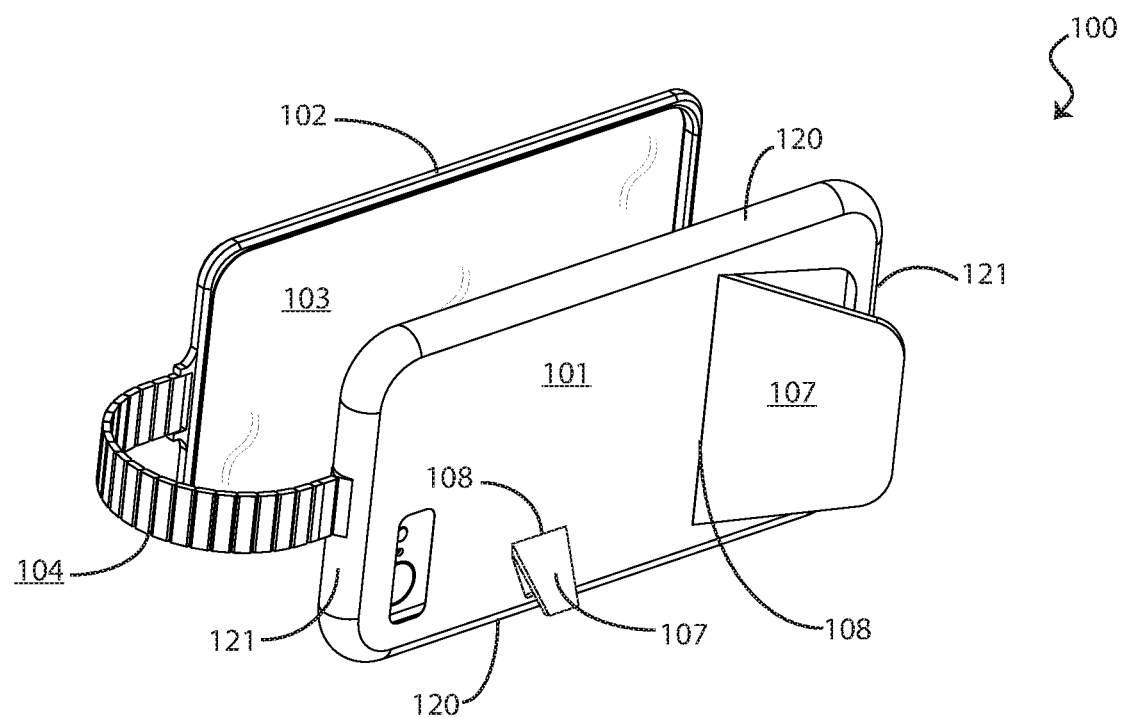
FIG. 9 is a rear perspective view of a multifunctional electronic device case holding an electronic device and supported horizontally by a deployed stand

FIG. 3 is a back view of a multifunctional phone case holding an electronic device. In addition to body 101 and hinge member 104, FIG. 3 shows a stand 107. In some embodiments, electronic device case 100 comprises stand 107 coupled to body 101. Stand 107 is any structure wherein case 100 is retained in a semi-upright position to facilitate viewing of device screen 111. A wide variety of shapes and designs of stand 107 are possible, beyond the general polygonal shape and location of stand 107 shown in the several drawing figures. Stand 107 is coupled at any location of an outer surface of body 101, without limitation. Stand 107 may be hingely coupled, detachably coupled, or formed as a unitary body with body 101 of case 100. In some embodiments, stand 107 is moved by a user between a retracted first position and a deployed second position. For example, FIGS. 7-9 show stand 107 in a deployed second position, whereas FIG. 3 shows stand 107 in a retracted first position. In some embodiments wherein stand 107 is formed as a unitary body with body 101, stand 107 is fixed in the retracted first position. Some embodiments of device case 100 to not comprise stand 107.

Figure 4:
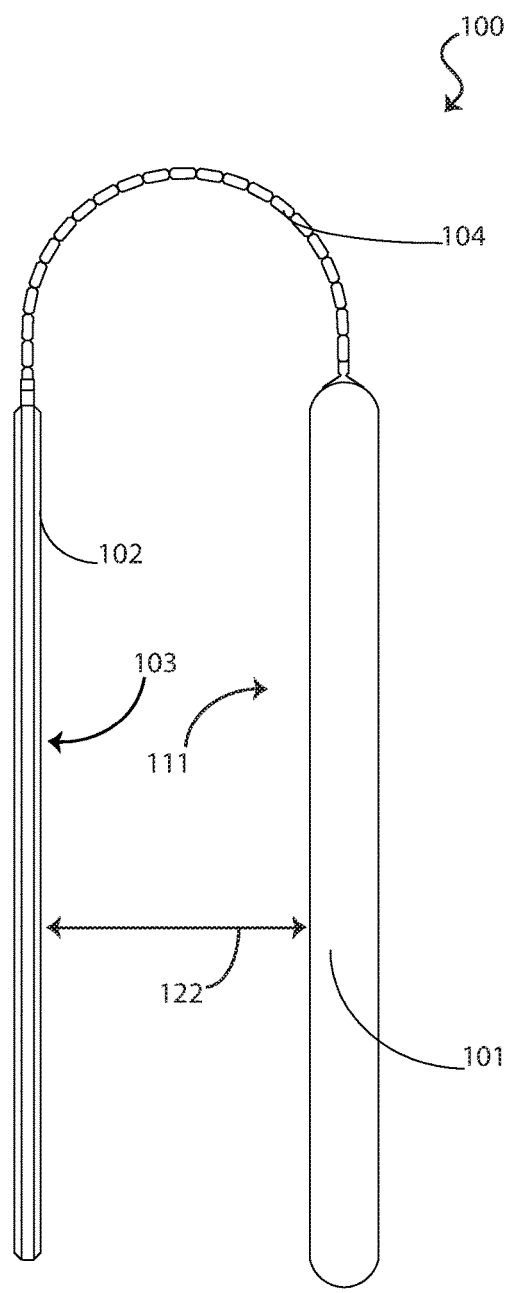
FIG. 4 is a right side view of a multifunctional electronic device case with an electronic device and a partially deployed cover.
Figure 5:
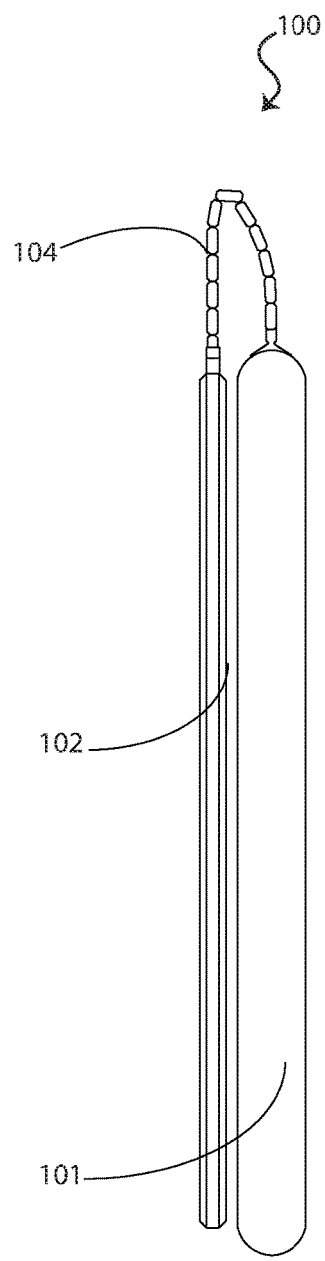
FIG. 5 is a left side view of a multifunctional electronic device case holding an electronic device and a stored cover.

FIG. 4 is a right side view of a multifunctional phone case with an electronic device and a partially deployed cover 102. FIG. 4 shows a profile of cover 102 positioned a distance 122 from device screen 111. Conversely, FIG. 5 is a left side view of a multifunctional phone case holding an electronic device and a stored cover showing cover 102 directly proximate to body 101. The multi-hinge design of hinge member 104 allows positioning of cover 102, and consequently lens 103, at a distance 122 having any value along a continuum within a range of distances 122 determined by the size and number of individual hinges forming hinge member 104.

Figure 6:
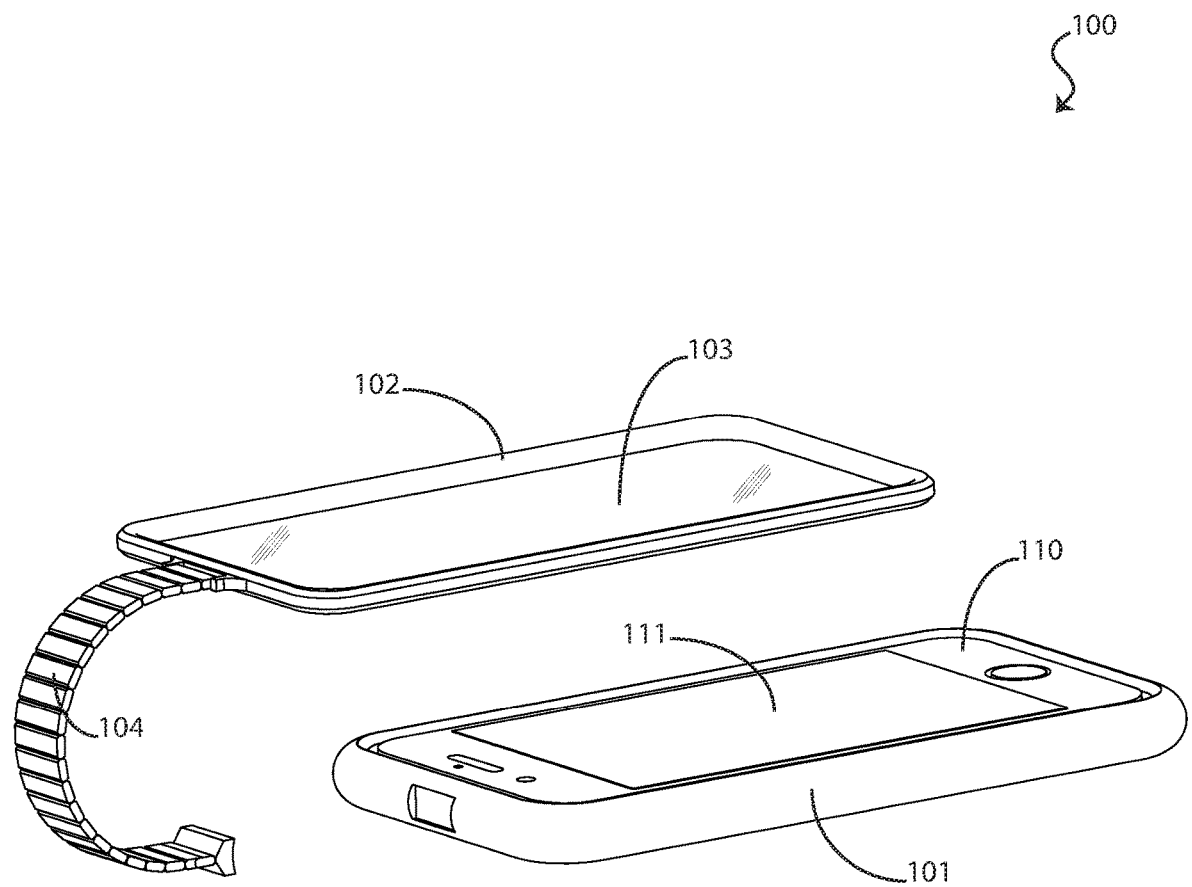
FIG. 6 is a perspective view of a multifunctional electronic device case holding an electronic device and a detached cover.

FIG. 6 is a perspective view of a multifunctional phone case holding an electronic device and a detached cover. FIG. 6 shows a representative embodiment wherein a user of case 100 may detach cover 102 with hinge member 104 completely from body 101. For example, in some embodiment, body 101 comprises a receiver for detachably receiving hinge member 104, wherein hinge member 104 is a poly-articulated multiple hinge capable of positioning cover 102 bearing lens 103 flush against either device screen 111 or a rear-aspect of electronic device 110, or in any position on a continuum between flush with device screen 111 and the rear-aspect of electronic device 110. In this way, the user may employ magnifying lens 103 in a variety of uses unrelated to viewing device screen 111, or other functions related to electronic device 110.

In some embodiments, lens 103 may be deployed by a user by moving sliding member 105 to position hinge member 104 away from body 101, allowing the user to then rotate lens 103 180° away from body 101. Sliding member 105 may then be moved back to re-position hinge member 104 proximate to body 101. When used in this manner, lens 103 remains coupled to hinge member 104 in a position extending outward from case 100, wherein the user may hold case 100 to position lens 103 to magnify small text or items without detaching lens 103 or cover 102 from body 101.

For example, a detached lens 103 mounted on cover 102 can be used to assist a user in reading fine-print on product labels or other printed material, reading a menu, viewing details on a map, and the like. Because owners of electronic devices, such as smartphone devices, generally keep the device on their person at most times, a user of case 100 can expect to always have a magnifying lens readily available. This obviates the need for the user to carry a conventional text magnifying means, such as reading glasses, in many situations. A point of reversible attachment for hinge member 104 from body 101 is shown in FIG. 6 by way of example only. In some embodiments, hinge member 104 reversibly attaches to cover 102. Wherein hinge member 104 reversibly attaches to body 101 and remains attached to cover 102, however, hinge member 104 may be used as a handle for a user of case 100 to hold lens 103 in a desired position relative to text, other printed material, or object surface the user seeks to view in proper focus or with magnification.

In some embodiments, case 100 is supplied with a plurality of covers 102 bearing a lenses 103 with different focal lengths, different magnification factors, or different focal lengths and magnification factors, wherein the user of case 100 may interchange different covers 102, each bearing a different lens 103, to utilize lens 103 of the desired magnification or focal length. Exchanging cover 102 comprises detaching hinge 104 from body 101, in some embodiments. In some embodiments, exchanging cover 102 comprises detaching hinge 104 from cover 102.

In some embodiments, lens 103 is detachably coupled to cover 102. For example, a user can remove lens 103 from cover 102 by disengaging the edge or some like surface feature of lens 103 from a complementary receiving groove or other surface feature of cover 102. In these and similar embodiments, the user of case 100 may remove lens 103 comprising one magnification factor and focal length with lens 103 having a different magnification factor, a different focal length, or a different magnification factor and a different focal length.

FIG. 7 is a front perspective view of a multifunctional phone case holding an electronic device and supported vertically by a deployed stand and FIG. 8 is a rear perspective view of a multifunctional phone case holding an electronic device and supported vertically by a deployed stand. FIG. 7 and FIG. 8 show stand 107 supporting electronic device 110 in a substantially vertical position. This is useful to a user of case 100, wherein the user can support device 110 on a surface, such as a desk or countertop, for immediate viewing of screen 111 without needing to pick-up or otherwise reposition device 110.

FIG. 9 is a rear perspective view of a multifunctional phone case holding an electronic device and supported horizontally by a deployed stand. As shown in drawing figures, stand 107 is coupled to base 101 by stand coupling 108, in some embodiments. In some embodiments of case 100, body 101 has a long side 120 and a short side 121, as shown by FIG. 9. Stand coupling 108 is located at a position on base 101 wherein device screen 111 is presented for viewing by the user of case 100. This position may be oriented generally parallel to long side 120, or generally parallel to short side 121 of body 101. In some embodiments, including the example embodiment shown by FIG. 9, a plurality of stands 107 are coupled to base 101, wherein a user of case 100 may view device screen 111 oriented in a "portrait" screen position (as shown by FIG. 8 and FIG. 9) or a "landscape" screen position as shown by FIG. 9. In some embodiments, stand coupling 108 is coupled to body 101 in any number alternative orientations not shown in the drawing figures to facilitate viewing of an image displayed on device screen 111 for the user.

In some embodiments, including those shown in FIGS. 10-13, case 100 comprises a sliding member 105 coupled to body 101 and cover 102. In some additional embodiments, sliding member 105 is coupled to hinge member 104, which is, in turn, coupled to cover 102. This mechanism employing a sliding member increases the versatility, as described in detail below, wherein lens 103 mounted on cover 102 can be positioned by a user of case 100 to optimally view images displayed on device screen 111, particularly with some electronic devices 110, such as a larger tablet device.

Figure 10:
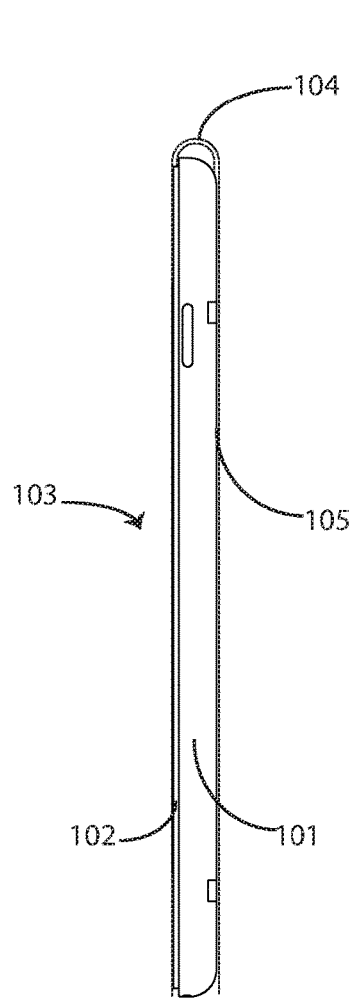
FIG. 10 is a right side view of a multifunctional electronic device case holding an electronic device with a closed sliding member.
Figure 11:
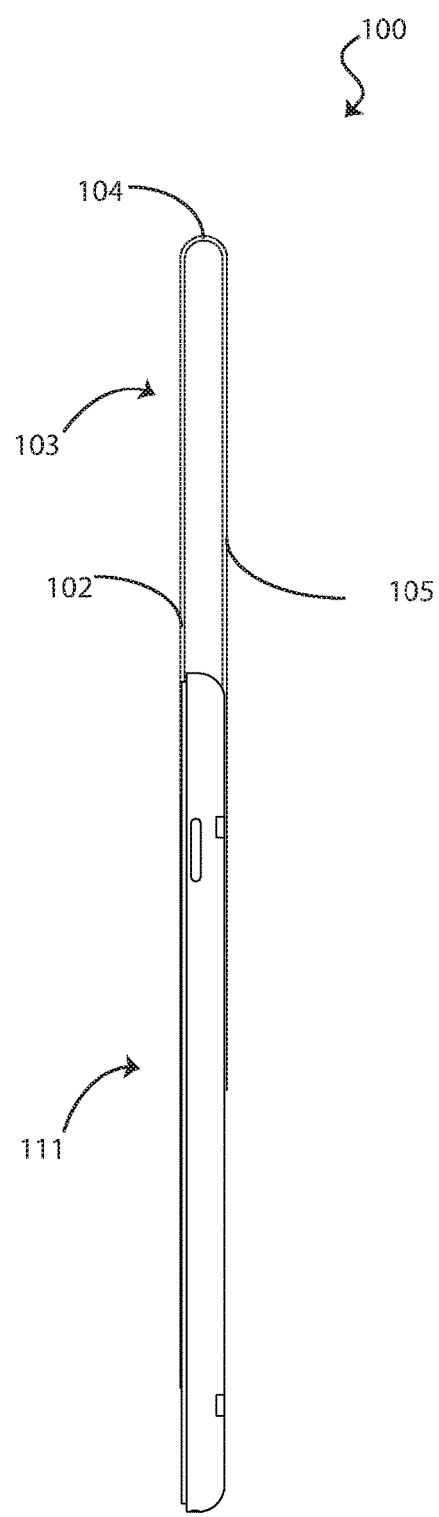
FIG. 11 is a right side view of a multifunctional electronic device case holding an electronic device with a partially open sliding member.

FIG. 10 is a left side view of a multifunctional phone case holding an electronic device with a closed sliding member and FIG. 11 is a left side view of a multifunctional phone case holding an electronic device with a partially open sliding member. In some embodiments, sliding member 105 is coupled to body 101 and is a means for cover 102 to move in a plane generally parallel with body 101 and device screen 111, as shown in FIG. 10 and FIG. 11. Most conventional device screens today are touch-activated screen, wherein a user contacts the screen with a fingertip to touch, tap, or swipe the device scree to input an instruction to the electronic device. In some embodiments of case 100 wherein lens 103 partially or completely blocks a user from touching device screen 111, such as the example embodiments shown in FIG. 1, FIG. 4, FIG. 7, and FIG. 8, the user may not be able to easily input touch-activated commands to electronic device 110. In some embodiments of case 100 comprising sliding member 105, therefore, cover 102 and lens 103 can be moved away from device screen 111 by causing sliding member 105 to move from a position relative to body 101 shown in FIG. 10 to the position shown by FIG. 11. The user, therefore, can activate sliding member 105 to move lens 103 from a position proximate to device screen 111 wherein observation of an image displayed on screen 111 may be comfortably viewed under magnification, such as the position shown in FIG. 10, to a position away from device screen 111 wherein screen 111 is unobstructed by lens 103 or cover 102 allowing the user to input touch commands via screen 111, such as the position shown in FIG. 11.

In some embodiments, including the embodiments shown in FIG. 10 and FIG. 11, movement of sliding member 105 is generally linear. In some embodiments (not shown by the drawing figures), movement of sliding member 105 is generally curvilinear, such as in an arc-shape, for example. In some embodiments, sliding member 105 is coupled to body 101 such that cover 102 and lens 103 move in a generally linear direction parallel to long side 120, such as in the example embodiments shown in FIG. 10 and FIG. 11. In some embodiments, sliding member 105 is coupled to body 101 such that cover 1021 and lens 103 move in a generally linear direction parallel to short side 121 of body 10 (not shown in the drawing figures).

Figures 12, 13:
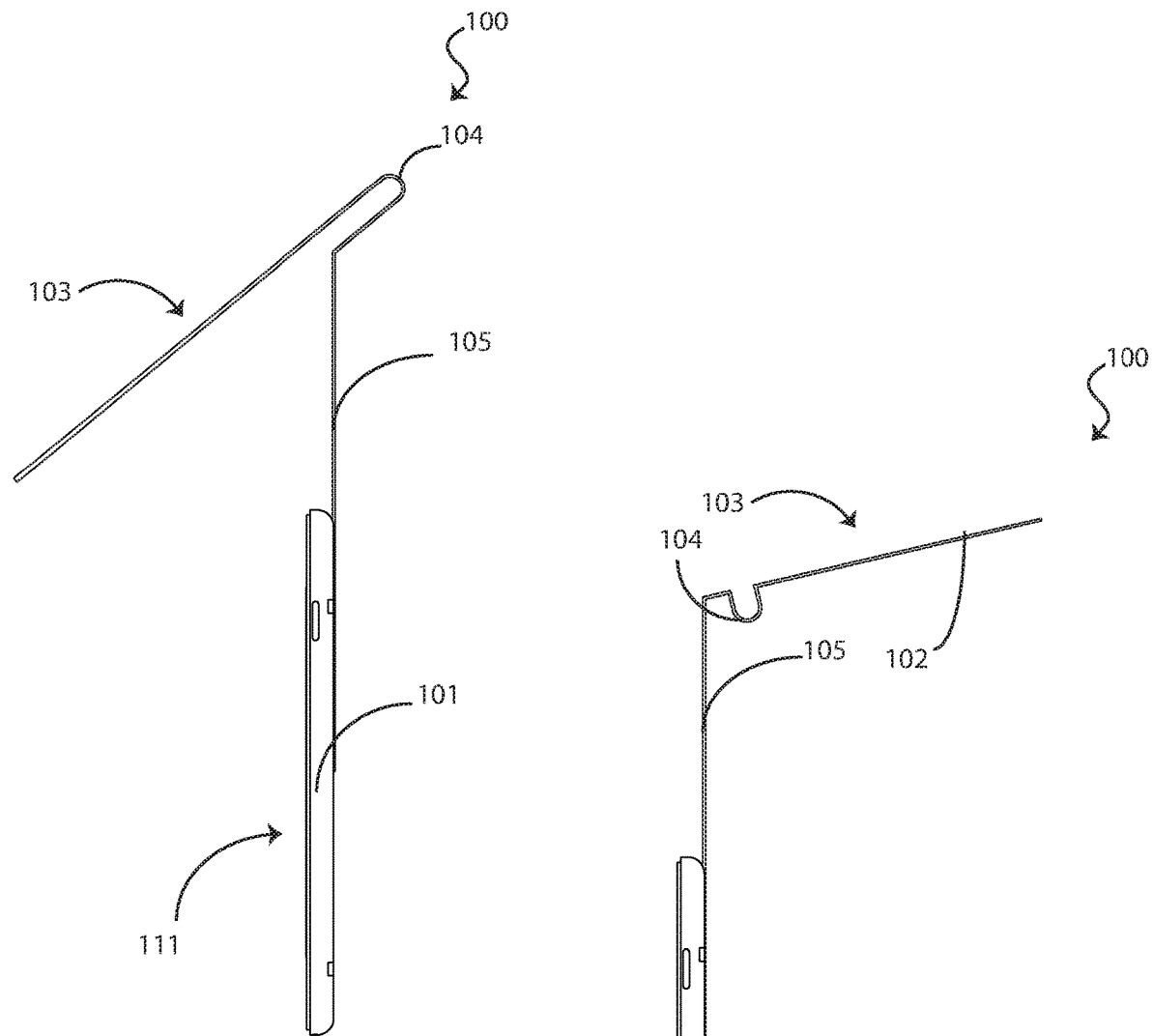
FIG. 12 is a left side view of a multifunctional electronic device case holding an electronic device with an open sliding member and a partially deployed cover.
FIG. 13 is a left side view of a multifunctional electronic device case holding an electronic device with an open sliding member and a reverse-deployed cover.

Additionally, some embodiments of case 100 enable a user to slide cover 102 and lens 103 away from a position proximate to device screen 111, and to also rotate cover 102 and lens 103 further away from screen 111. FIG. 12 is a left side view of a multifunctional phone case holding an electronic device with an open sliding member and a partially deployed cover and FIG. 13 is a left side view of a multifunctional phone case holding an electronic device with an open sliding member and a reverse-deployed cover. In some embodiments comprising both sliding member 105 and hinge member 104, cover 102 and lens 103 may be slid and rotated completely away from the front aspect of electronic device 110, wherein cover 102 and lens 103 are positioned proximate to a rear aspect of body 100 and electronic device 110. For example, a user may move sliding member 105 causing lens 103 to uncover device screen 111, such as shown by FIG. 11 and FIG. 12, and additionally rotate cover 102 on hinge member 104 wherein cover 102 and lens 103 are positioned proximate to body 101, such as the position shown by FIG. 13.

Figure 14A:
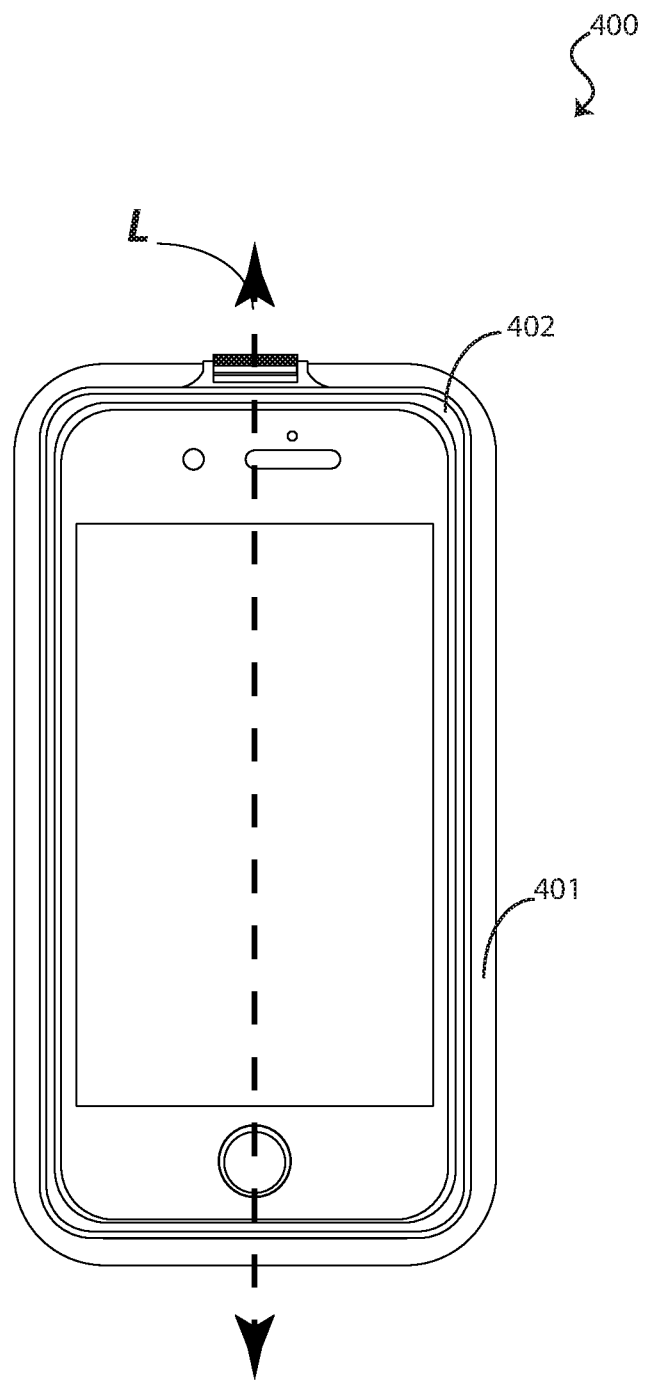
FIG. 14a is a front view of a multifunctional electronic device case holding an electronic device showing a sectional line "L"

An alternative embodiment of a multifunctional electronic device case holding a personal electronic device is shown in FIGS. 14a-c. In this, and some other embodiments, polyarticular hinge member 104 (of device case 100) is replaced with an articulating member coupled to single hinges positioned at opposite ends of the articulating member. Additionally, the alternative embodiment pictured comprises a recess coupled to the body of the electronic device case, wherein the lens-bearing cover can be rotated generally parallel to then slid partially or completely inside the recess for protective storage.

FIG. 14a is a front view of a multifunctional electronic device case 400 holding an electronic device showing a sectional line "L." Sectional line L marks the location of a cross-sectional plane of the phone case holding a personal electronic device shown in FIG. 14b and FIG. 14c. FIG. 14a also shows a body 402 of electronic device case 400 bearing a cover 402 positioned over the screen-bearing front side of the electronic device.

FIG. 14b is a cross-sectional view through line L of a multifunctional electronic device case holding an electronic device and having an articulating member with a cover positioned over a device screen and FIG. 14c is a cross-sectional view through line L of a multifunctional electronic device case holding an electronic device having an articulating member with a cover positioned in a recess.

FIG. 14b shows a cover 402 coupled to a lens 403 positioned at a distance 422 in front of a device screen 411 of the personal electronic device. Device case 400 has a body 401 coupled to a sliding member 405 at a position proximate to a recess 404. Recess 404 is a pocket, pouch, or similar feature which is formed as a unitary element of body 401 in some embodiments, or, as a separate component coupled to body 401, in some embodiments. Recess 404 is shaped, generally, to receive cover 402 coupled to lens 403 when lens 403 is not being used to magnify an image on device screen 411.

Sliding member 405 is coupled to a first hinge 406 and moves along or within a surface feature of body 401, in some embodiments. First hinge 406 is also coupled to an articulating member 407. Articulating member 407 is coupled to cover 402 by a second hinge 408. In some embodiments, a user of device case 400 adjust distance 422 by partially flexing first hinge 406 and second hinge 408 whereupon an image displayed on device screen 411 is optimally magnified for viewing by the user.

In some embodiments, lens 403 may be deployed by a user by moving sliding member 405 to withdraw lens 403 from recess 404 and position second hinge 408 away from body 401, allowing the user to then rotate lens 403 180° away from body 401 at second hinge 408. Sliding member 405 may then be moved back to re-position second hinge 408 proximate to body 401. When used in this manner, lens 403 remains coupled to second hinge 408 in a position removed from recess 404 and extending outward from case 400, wherein the user may hold case 400 to position lens 403 to magnify small text or items without detaching lens 403 or cover 402 from body 401.

When the user is finished using lens 403, the user may store cover 402 bearing lens 403 within recess 404 by rotating cover 402 at second hinge 408 to a position alongside articulating member 407 and rotating articulating member 407 at first hinge 406 to a position generally parallel with sliding member 405. Cover 402, positioned alongside articulating member 407 and articulating member 407 can now be moved into recess 404 by moving sliding member 405.

A multifunctional case for a phone or other personal electronic device has been disclosed. The different embodiments of the multifunctional phone case allow a user many options for positioning a magnifying lens relative to the screen of a personal electronic device held within the case. Embodiments wherein a magnifying lens is detachable from the case additionally provide the user with a more convenient and readily available alternative to reading glasses, or other magnifying means completely separate from a smartphone or other device case, to assist the user in reading small print.

Figure 15:
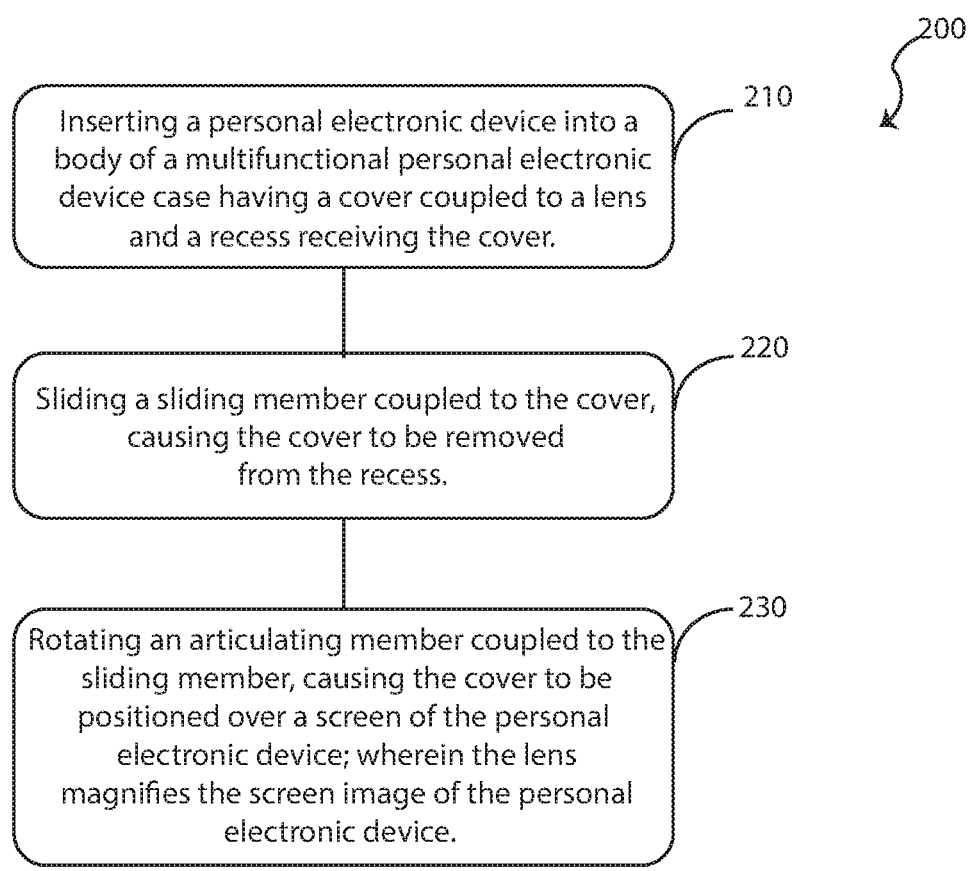
FIG. 15 is a block diagram of a method of using a multifunctional electronic device case to magnify a screen image displayed by a personal electronic device.

FIG. 15 is a block diagram of a method of using a multifunctional electronic device case to magnify a screen image displayed by a personal electronic device. FIG. 15 shows a method 200 comprising an inserting step 210, a sliding step 220, and a rotating step 230.

Inserting step 210 comprises inserting a personal electronic device into a body of a multifunctional personal electronic device case having a cover coupled to a lens and a recess receiving the cover.

Sliding step 220 comprises sliding a sliding member coupled to the cover, causing the cover to be removed from the recess. The sliding member is any means wherein a lens, such as a magnifying lens coupled to the case body by a sliding member, so that a user of the multifunctional electronic device case may move the lens relative into or out of a recess of the case body by activating the sliding member. In some embodiments, movement of the sliding member is linear. In some embodiments, movement of the sliding member is curvilinear, such as in an arc.

Rotating step 230 comprises rotating an articulating member coupled to the sliding member, causing the cover to be positioned over a screen of the personal electronic device; wherein the lens magnifies the screen image of the personal electronic device. Many possible configurations of the cover relative to the screen are possible. The position of the cover relative to the screen is adjusted by rotating an articulating member relative to the sliding member at a first hinge and by rotating the cover relative to an end of the articulating member opposite the first hinge at a second hinge. The relative positions of the articulating member with the sliding member and the cover are maintained by internal friction between components forming the first hinge and components forming the second hinge, in some embodiments.

Figure 16:
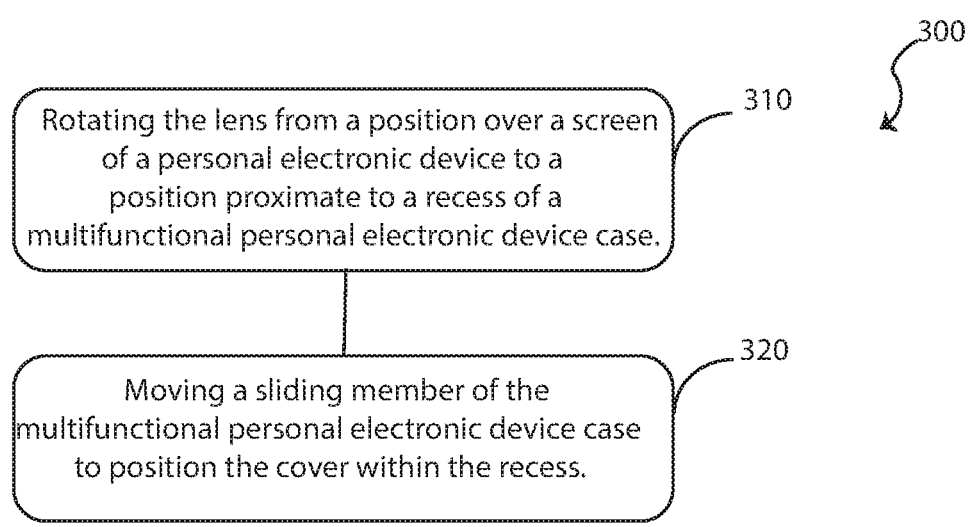
FIG. 16 is a block diagram of a method of stowing a lens of a multifunctional personal electronic device case used for magnifying an image displayed on the device screen.
Figure 17:
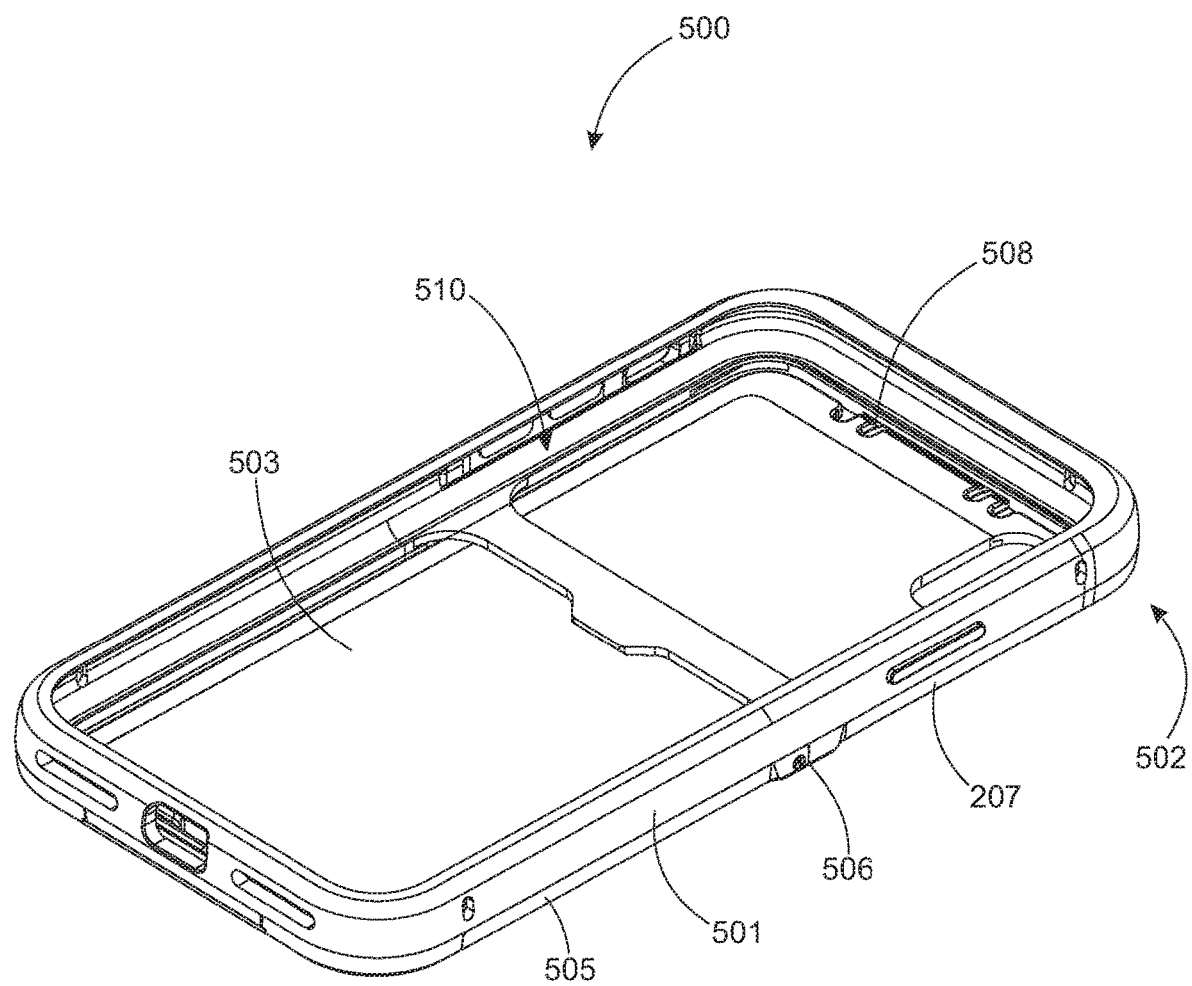
FIG. 17 is a front bottom perspective view of a multifunctional device case with a magnifying device in a stored position according to an embodiment.
Figure 18:
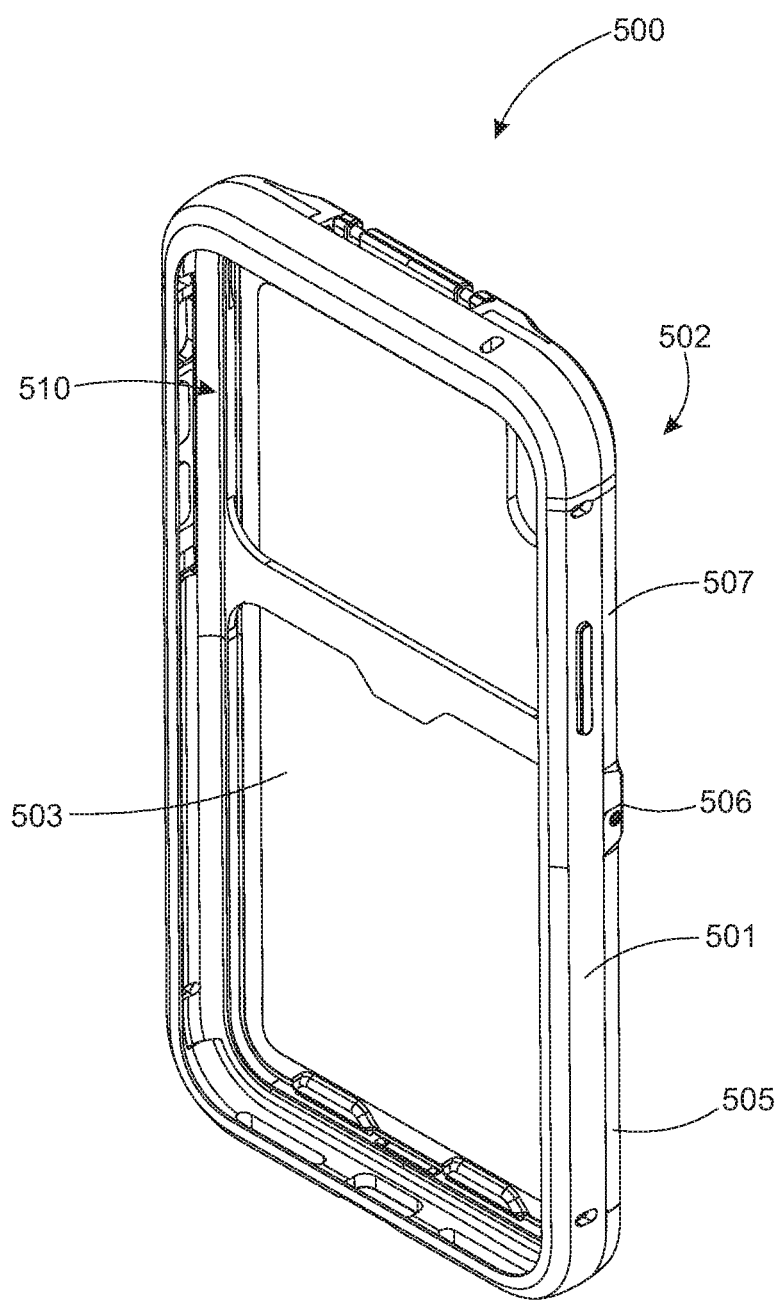
FIG. 18 is a front top perspective view of a multifunctional device case with a magnifying device in a stored position according to an embodiment.
Figure 19:
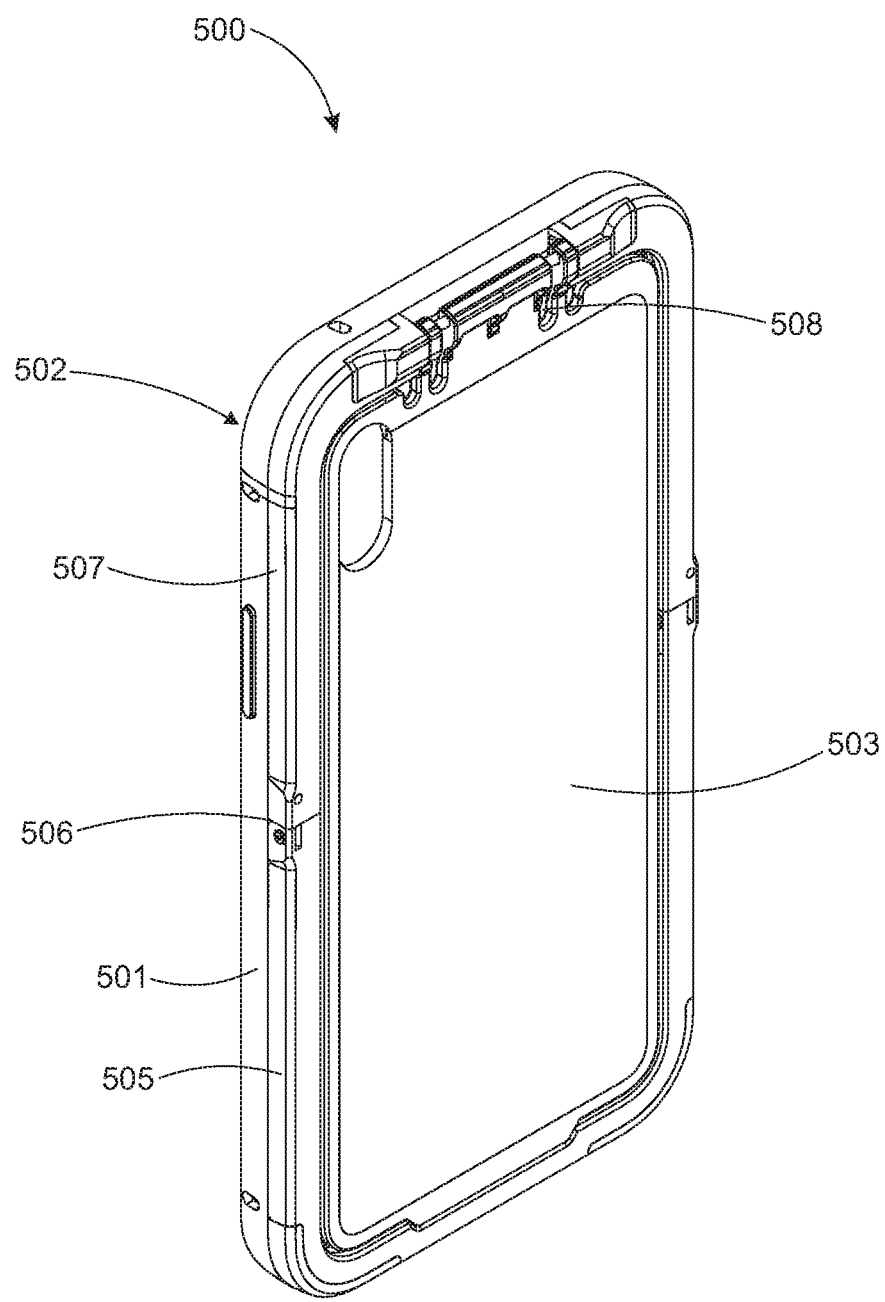
FIG. 19 is a rear perspective view of a multifunctional device case with a magnifying device in a stored position according to an embodiment.

FIG. 16 is a block diagram of a method of stowing a lens of a multifunctional personal electronic device case used for magnifying an image displayed on the device screen. FIG. 16 shows a method 300 comprising a rotating step 210 and a moving step 320.

Rotating step 310, in some embodiments, comprises rotating a lens from a position over a screen of a personal electronic device to a position proximate to a recess of a multifunctional personal electronic device case to position the cover within the recess.

Moving step 320, in some embodiments, comprises moving a sliding member of the multifunctional personal electronic device case to position the cover within the recess.

Figure 20:
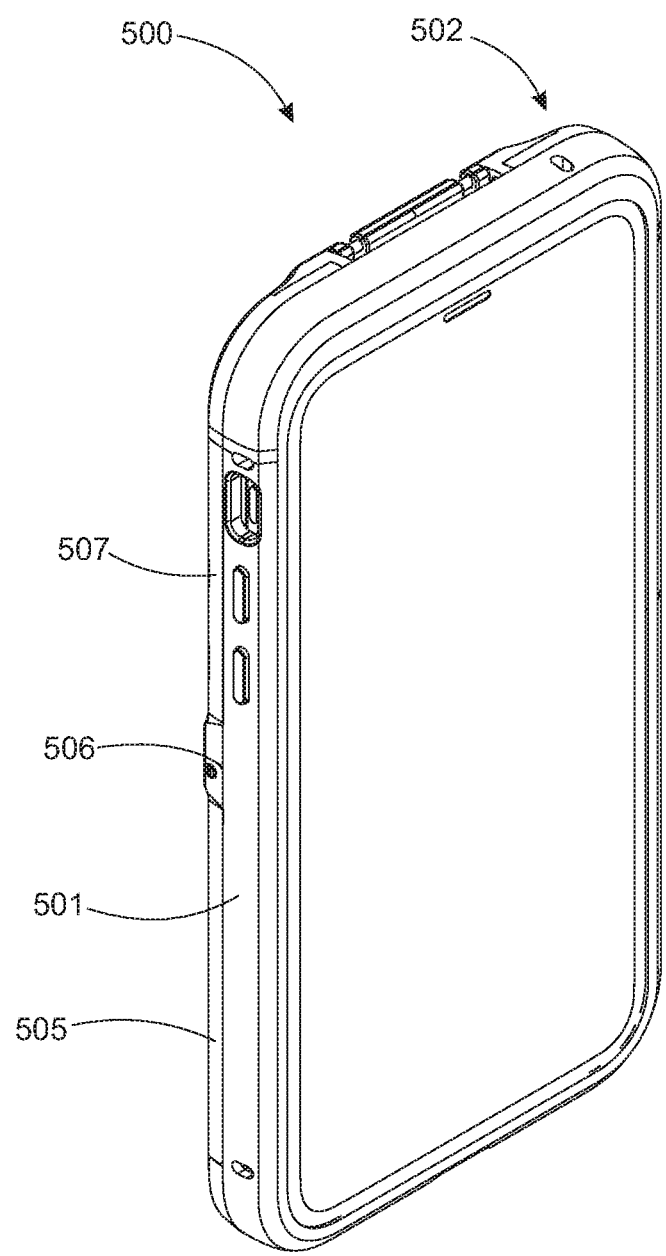
FIG. 20 is a front perspective view of a multifunctional device case with a magnifying device in a stored position and a mobile device coupled thereto according to an embodiment.
Figure 21:
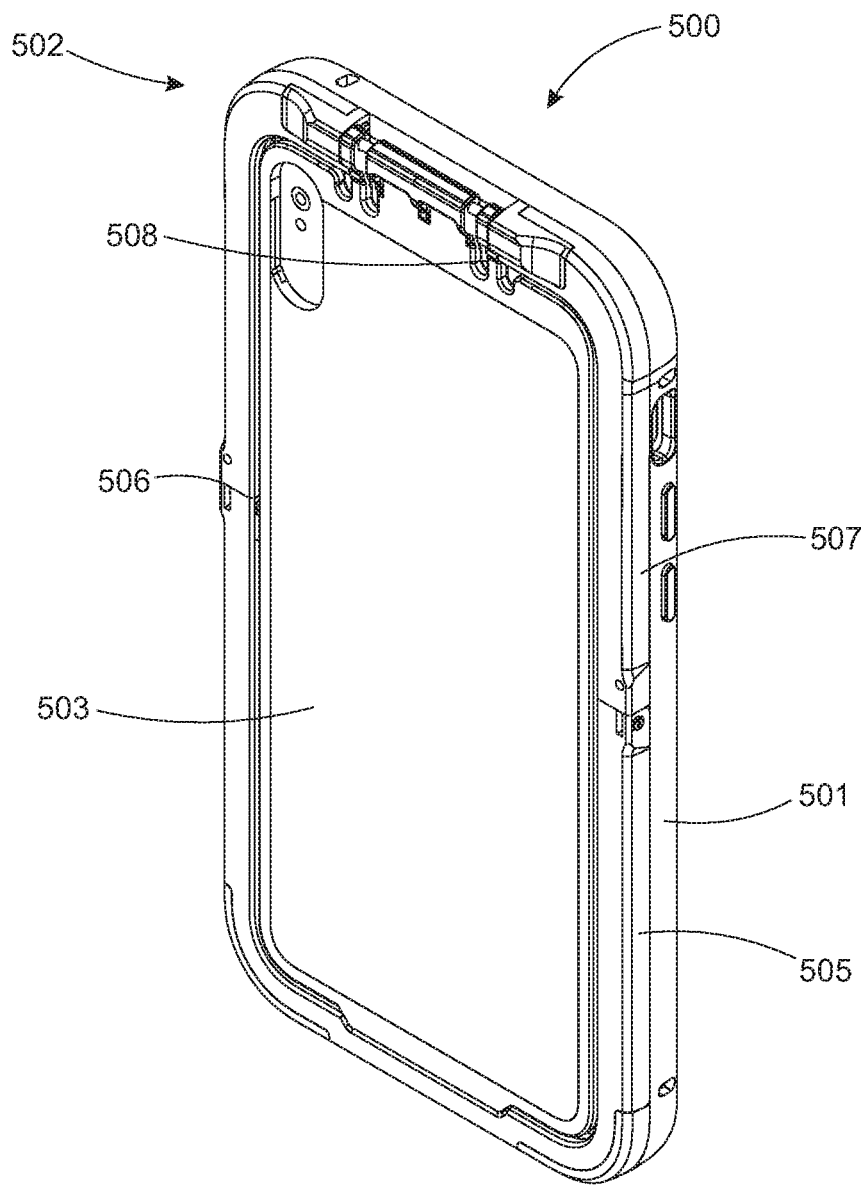
FIG. 21 is a rear perspective view of a multifunctional device case with a magnifying device in a stored position and a mobile device coupled thereto according to an embodiment.

An alternative embodiment of a multifunctional electronic device case 500 is depicted in FIGS. 17-23. Device case 500 comprises a body 501 with an opening 510 configured to receive personal electronic device or a mobile device 520, as depicted in FIGS. 17-21, wherein the body 501 is configured to retain the mobile device 520 within an inner volume by inserting the mobile device 520 within the opening 510 and retained in a position that a screen of the mobile device 520 is exposed and accessible as depicted in FIG. 20.

The device case 500 is coupled to a magnifying device 502. Magnifying device 502 may comprise a sliding member 505 coupled to the device case 500, wherein the sliding member 505 is slidable along a length of the device case 500 and comprises a first end and an opposing second end. The second end of the sliding member 505 may be rotatably coupled to a first end of an articulating member 507 with a first hinge 506. First hinge 506 may be configured to allow the articulating member 507 to rotate in one direction when moving into the magnifying position and may restrict the articulating member 507 from rotating past a position wherein the articulating member 507 is in a same plane as the sliding member 505 when moving into the stored position. The magnifying device 502 further comprises a lens 503, which is a magnifying lens, that may be rotatably coupled to a second end of the articulating member 507 with second hinge 508. Second hinge 508 may be configured to allow the lens 503 to rotate in one direction when moving into the magnifying position and may restrict the lens 503 from rotating past a position wherein the lens 503 is in a same plane as or parallel with the articulating member 507 when moving into the stored position. Lens 503 is a magnifying lens. Additionally, the lens 503 may include an aperture 504, wherein the aperture 504 corresponds to a rear facing camera or cameras of the mobile device 520 such that the aperture 504 prevents the lens from covering the rear facing camera or cameras when in the stored position.

Figure 22:
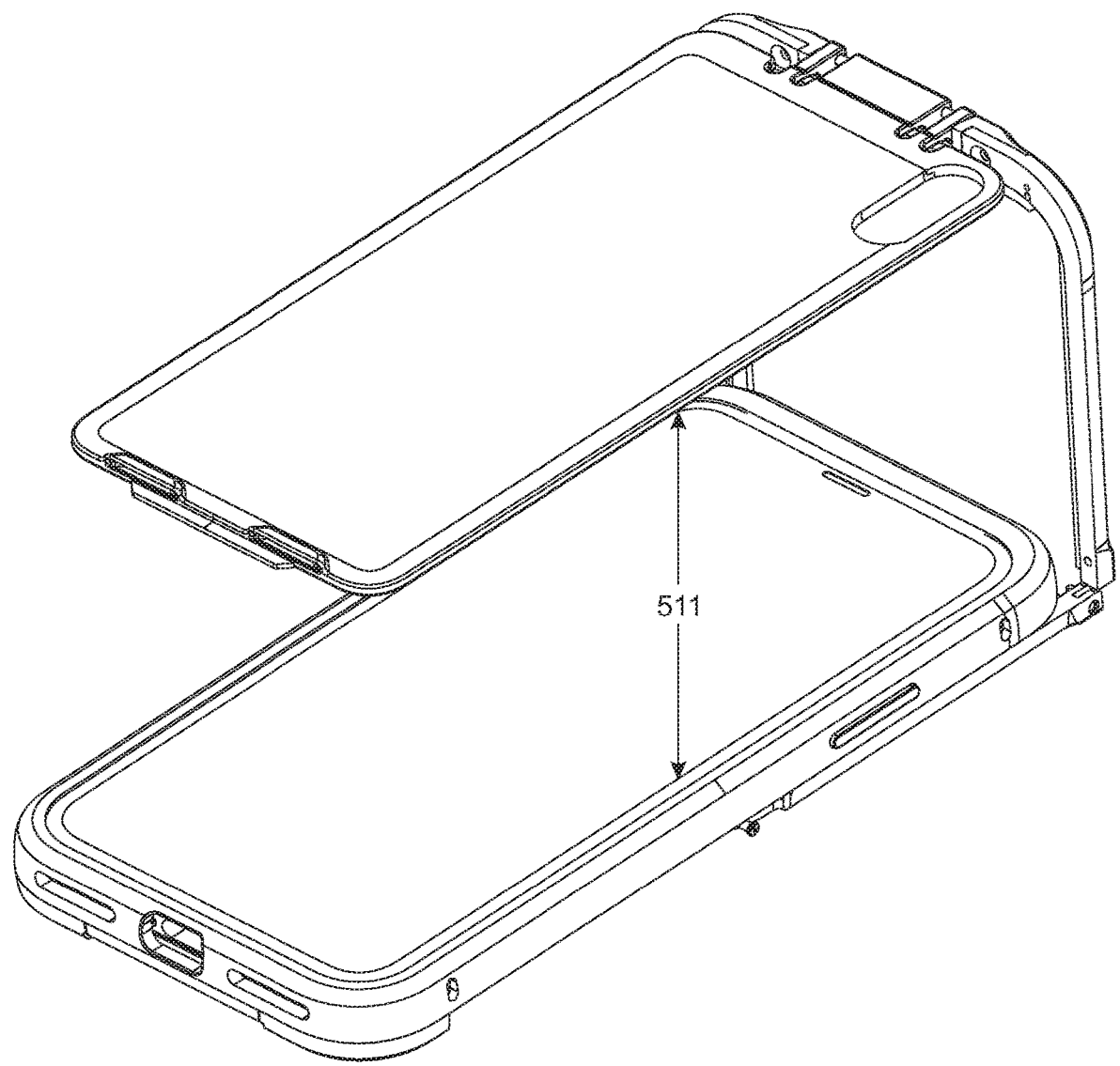
FIG. 22 is a front perspective view of a multifunctional device case with a magnifying device in a magnifying position according to an embodiment.
Figure 23:
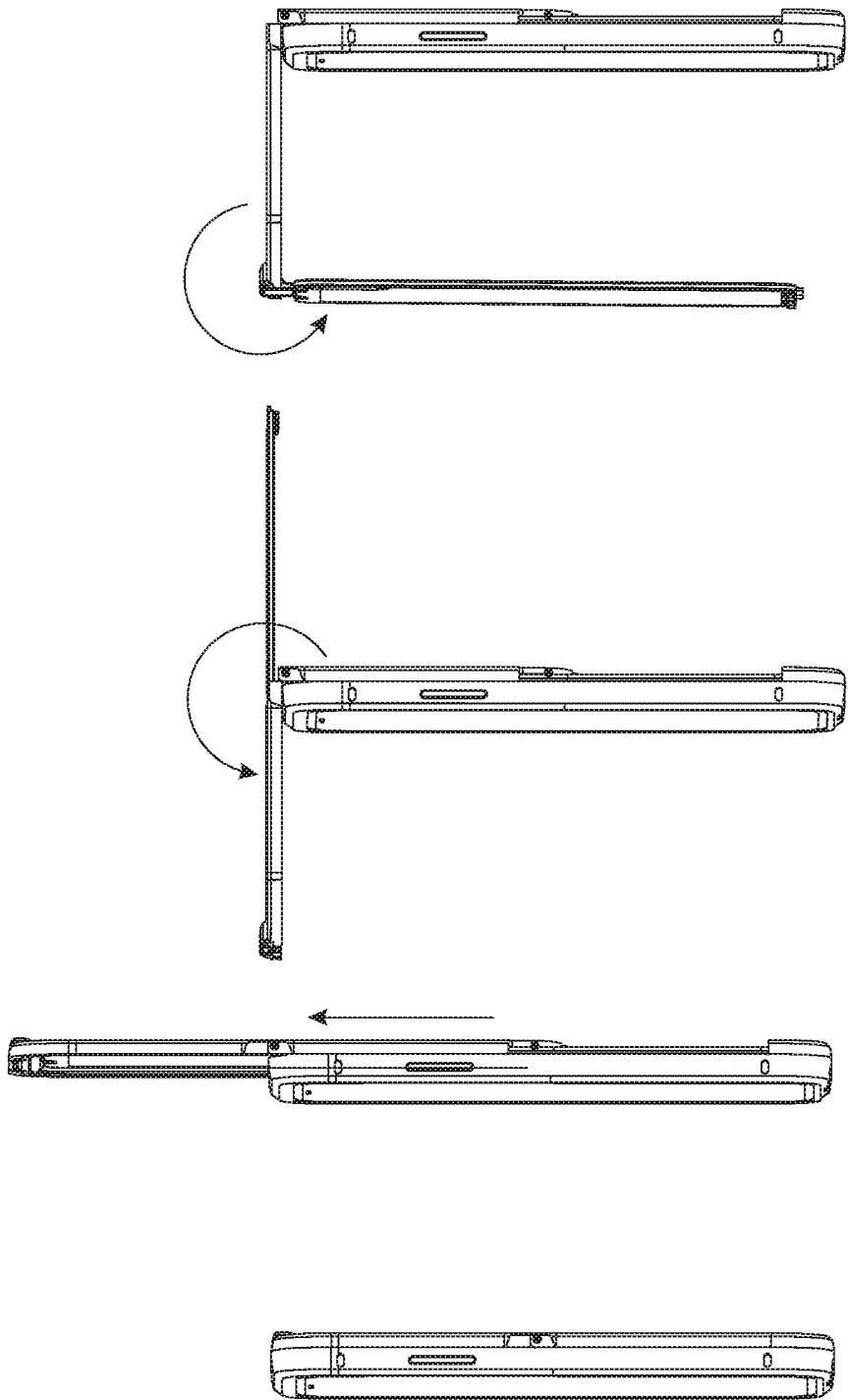
FIG. 23 is a side view of a multifunctional device case moving from a stored position to a magnifying position according to an embodiment.

In embodiments, as shown in FIGS. 22 and 23, the magnifying device 502 may be moved from a stored position to a magnifying position. The stored position comprises the sliding member and the articulating member within a same plane and the lens adjacent to and within the same plane as the sliding member and the articulating member or adjacent to and parallel to the sliding member and the articulating member. When in the magnifying device is in the stored position, the lens 503 operates as a protection to a rear surface of the mobile device 520 when in the stored position by covering the rear surface. The magnifying position comprises the articulating member perpendicular to the sliding member, the lens perpendicular to the articulating member and the lens parallel to the sliding member with the lens spaced from and positioned over a screen of the mobile device retained within the body.

Moving the magnifying device 502 from the stored position to the magnifying position may include lens 503 being deployed by moving sliding member 505 along a length of the device case body 501 until the second end of the sliding member 505 is adjacent a top of the body 501 of the device case 500. The articulating member 507 may be rotated toward the opening 510 of the device case 500 to a position approximately perpendicular to the sliding member 505 using first hinge 506. The rotation of the articulating member 507 results in rotation of the lens 503 such as lens 503 is also approximately perpendicular to the sliding member 505. The lens 503 may then be rotate about the second hinge 508 toward a bottom side of the body 501 of the device case 500 to a position approximately perpendicular to the articulating member 507 and approximately parallel to the sliding member 505, wherein the lens 503 is spaced apart from the sliding member 505 to place the lens a distance 511 from the screen of the mobile device 520. The distance 511 may be controlled by the lengths of the sliding member 505 and the articulating member 507 to lengthen or reduce the length of the articulating member 507 will result in increasing or decreasing the distance 511 of the lens 503 from the screen of the mobile device 520. Additionally, the lens 503 may provide any amount of magnification so long as it provides a magnification. This allows for easier viewing of the content displayed on the screen of the mobile device 520. Once the use of magnifying the screen of the mobile device is completed, the operation of moving the magnifying device 502 from the stored position to the magnifying position may be reversed to move the magnifying device 502 from the magnifying position to the stored position.

An embodiment may include a method of using a multifunctional device case. The method may comprise coupling a mobile device within a body of the multifunctional device case, the device case comprising a magnifying device; moving the magnifying device from a stored position to a magnifying position to place a lens of the magnifying device in a position over and spaced from a screen of the mobile device; magnifying content displayed on the screen of the mobile device with the lens; and moving the magnifying device from the magnifying position to the stored position. The method of moving the magnifying device between the stored position and the magnifying position is described above in detail with respect to FIGS. 17-23.

The components defining any multifunctional phone case may be formed of any of many different types of materials or combinations thereof that can readily be formed into shaped objects provided that the components selected are consistent with the intended operation of a multifunctional phone case. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any multifunctional phone case may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A multifunctional device case comprising:
a body having an opening for receiving a mobile device, wherein the body is configured to retain the mobile device within the body; and
a magnifying device coupled to the body of the device case, wherein the magnifying device comprises:
a sliding member coupled to the body on a side opposite the opening of the body;
an articulating member rotatably coupled to the sliding member with a first hinge; and
a lens rotatably coupled to the articulating member with a second hinge,
wherein the magnifying device is moveable between a stored position and a magnifying position, wherein:
the stored position comprises the sliding member and the articulating member within a same plane and the lens adjacent to and within the same plane as the sliding member and the articulating member or adjacent to and parallel to the sliding member and the articulating member; and
the magnifying position comprises the articulating member perpendicular to the sliding member, the lens perpendicular to the articulating member and the lens parallel to the sliding member with the lens spaced from and positioned over a screen of the mobile device retained within the body.

2. The case of claim 1, wherein the first hinge is configured to allow the articulating member to rotate in one direction when moving into the magnifying position.

3. The case of claim 2, wherein the first hinge is configured to restrict the articulating member from rotating past a position wherein the articulating member is in a same plane as the sliding member when moving into the stored position.

4. The case of claim 1, wherein the second hinge is configured to allow the lens to rotate in one direction when moving into the magnifying position.

5. The case of claim 4, wherein the second hinge is configured to restrict the lens from rotating past a position wherein the lens is in a same plane as or parallel with the articulating member when moving into the stored position.

6. The case of claim 1, wherein the sliding member moves in a direction between a top end and a bottom end of the body when moving between the stored position and the magnifying position.

7. The case of claim 1, wherein the lens comprises an aperture, wherein the aperture corresponds to a rear facing camera or cameras of the mobile device such that the aperture prevents the lens from covering the rear facing camera or cameras when in the stored position.

8. The case of claim 1, wherein the lens operates as a protection to a rear surface of the mobile device when in the stored position by covering the rear surface.

9. A method of using a multifunctional device case, the method comprising:
coupling a mobile device within a body of the multifunctional device case, the device case comprising a magnifying device;
moving the magnifying device from a stored position to a magnifying position to place a lens of the magnifying device in a position over and spaced from a screen of the mobile device;
magnifying content displayed on the screen of the mobile device with the lens; and
moving the magnifying device from the magnifying position to the stored position, wherein the magnifying device in the stored position comprises a sliding member and an articulating member of the magnifying device within a same plane and the lens adjacent to and within the same plane as the sliding member and the articulating member or adjacent to and parallel to the sliding member and the articulating member.

10. The method of claim 9, wherein the magnifying device in the magnifying position comprises the articulating member perpendicular to the sliding member, the lens perpendicular to the articulating member and the lens parallel to the sliding member.

* * * * *